United States Patent [19]

Yamasita

[11] 3,717,318
[45] Feb. 20, 1973

[54] ANTI-VIBRATORY APPARATUS

[75] Inventor: Kazuo Yamasita, Komaki, Japan

[73] Assignee: Tokai Rubber Industries, Ltd., Komaki-shi, Aichi-ken, Japan

[22] Filed: March 24, 1972

[21] Appl. No.: 237,853

[52] U.S. Cl. ............................248/24, 248/358 R
[51] Int. Cl. ..............................................F16f 15/00
[58] Field of Search ..........248/24, 22, 358 R, 350, 9, 248/188.4; 267/153

[56] References Cited

UNITED STATES PATENTS

| | | | |
|---|---|---|---|
| 1,934,746 | 11/1933 | Stoddard | 248/188.4 |
| 2,510,979 | 6/1950 | Ivanovic | 248/358 R |
| 2,921,760 | 1/1960 | Wheeler | 248/24 |
| 3,351,309 | 11/1967 | Harrison | 248/22 |
| 3,455,526 | 7/1969 | Sho Orii | 248/24 |
| 3,592,423 | 9/1969 | Billy of K. Mui | 248/24 |

Primary Examiner—J. Franklin Foss
Attorney—Richard C. Sughrue et al.

[57] ABSTRACT

An anti-vibratory apparatus for a machine stand, comprises a cylindrical anti-vibratory rubber member edge lines with an oil-resistant rubber plate, a disc-like metal plate is bonded to the upper surface of said rubber member and includes a concave portion having a relatively large radius of curvature at its center and a shoulder portion at its periphery, a tongue-like rubber member is bonded to said shoulder portion, a disc-like metal cap is spaced from said metal plate and includes a flange portion which holds tight the peripheral surface of the tongue-like member and leaves a space between it and the end surface of the tongue-like member and carries a convex portion at the central part which has a radius of curvature smaller than said concave portion of said plate. A boss including an internal thread, carries a leveling bolt having a rounded end surface with a far smaller radius of curvature screwed in the internal thread, with the end in contact with said concave portion of said plate.

2 Claims, 2 Drawing Figures

ANTI-VIBRATORY APPARATUS

BACKGROUND OF THE INVENTION

1. FIELD OF THE INVENTION

This invention relates to an anti-vibratory apparatus for a machine stand, and more particularly, to an improvement relating to an anti-vibratory apparatus having a leveling device.

2. DESCRIPTION OF THE PRIOR ART

Anti-vibratory apparatus for a machine stand performs the function of preventing vibration of the machine as much as possible from being transmitted to the floow surface on which it is installed. Furthermore, it is desirable that the anti-vibratory apparatus include a leveling device which is capable of adjusting the installation level of the machine after placing the anti-vibratory apparatus between the floor surface and the machine leg.

Accordingly, it is an object of this invention to provide an anti-vibratory apparatus including a leveling device which proves effective, especially when applied to a machine to be installed horizontally on an inclined floor surface and which can effectively utilize the amount of the level adjustment in machine installation.

SUMMARY OF THE INVENTION

According to this invention, there is provided an anti-vibratory apparatus comprising a cylindrical anti-vibratory rubber member lined with an oil-resistant rubber plate. A disc-like metal plate is bonded to the upper surface of said rubber member, said metal plate includes a shoulder portion bent downwards from its peripheral portion and a concave portion at its center having a curved surface with a large radius of curvature. A tongue-like rubber member of inversted L-shape, in section, is annularly continuous or intermittent. Said tongue-like rubber member is bonded at its one end to the shoulder portion. A disc-like metal cap is spaced from said metal plate and includes a flange portion of L shape in section and a convex portion projecting downwards from the undersurface of said metal cap at the center having a radius of curvature smaller than that of said concave portion. Said flange portion caulks said tongue-like rubber member so as to hold tight the peripheral surface of said tongue-like member and leave a space between it and the end surface of said tongue-like member. Said convex portion has secured thereto, a boss including an internal thread; and a leveling bolt having a rounded end surface with a far smaller radius of curvature is screwed in said internal thread.

BRIEF DESCRIPTION OF THE DRAWINGS

The invention will be described in greater detail by reference to the accompanying drawings in which.

DETAILED DESCRIPTION OF THE INVENTION

Figure 1:
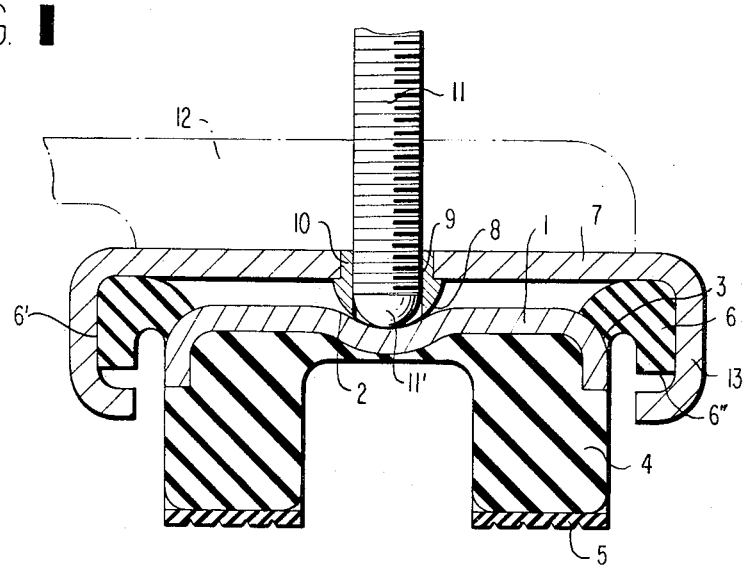
FIG. 1 is a vertical sectional view of the apparatus of this invention.

Referring to FIG. 1, a disc-like metal plate 1 includes a concave portion 2 at its center having a curved surface with a large radius of curvature and a shoulder portion 3 formed by bending the disc downwards at its periphery. To the undersurface of the metal plate 1 is bonded a cylindrical anti-vibratory rubber member 4 with its undersurface lined with an oil-resistant rubber plate 5. A tongue-like rubber member 6 having an inverted L-shape in section and being annularly continuous or intermittent is bonded at one end thereof to the shoulder portion 3 of the metal plate 1. A disc-like metal cap 7 having a flange portion 13 at its periphery and a boss 10 on its undersurface at the center is provided in a spaced-apart relationship with the metal plate 1. The flange portion 13 bends downwards from the periphery of the metal cap 7 and caulks the tongue-like member 6 in a manner such that it holds tight the outer peripheral surface 6' and leaves a space between it and the end surface 6''. The boss 10 projects downwards from the undersurface of the metal cap 7 at its central part, and includes a convex portion 8 having a curved surface with a radius of curvature smaller than that of the concave portion 2 of the metal plate 1. Boss 10 includes an internal thread 9 for screwing a leveling bolt 11. The leveling bolt 11 has a rounded surface at its end 11 which has a far smaller radius of curvature. A machine leg 12 is put over the leveling bolt 11 so as to permit the penetration of the bolt placed on the metal cap 7 through the machine leg.

In this construction, the leveling bolt 11 is revolved to move the metal cap 7 in a perpendicular direction to raise the machine leg 12. This permits the adjustment of the installation level of the machine.

The anti-vibratory apparatus in accordance with this invention proves especially effective when it is desired to install a machine horizontally on an inclined floor. The rounded end surface of the leveling bolt 11 is loosely fitted in the arcuate concave portion 2 which is provided in the metal plate 1 bonded to the anti-vibratory rubber member 4. The load of the machine leg 12 is supported with this concave portion 2 as a fulcrum. Where the installation floor is inclined, the bolt makes a kind of rotary motion about the fulcrum. The rotary motion is not obstructed owing to the effect that is produced by the space between the end surface 6'' of the tongue-like member 6 and the flange portion 13 and also to the good flexibility of said tongue-like member 6 due to its flexural deformation. Therefore, the machine can be installed without adversely affecting the anti-vibratory rubber member 4 in any way.

Figure 2:
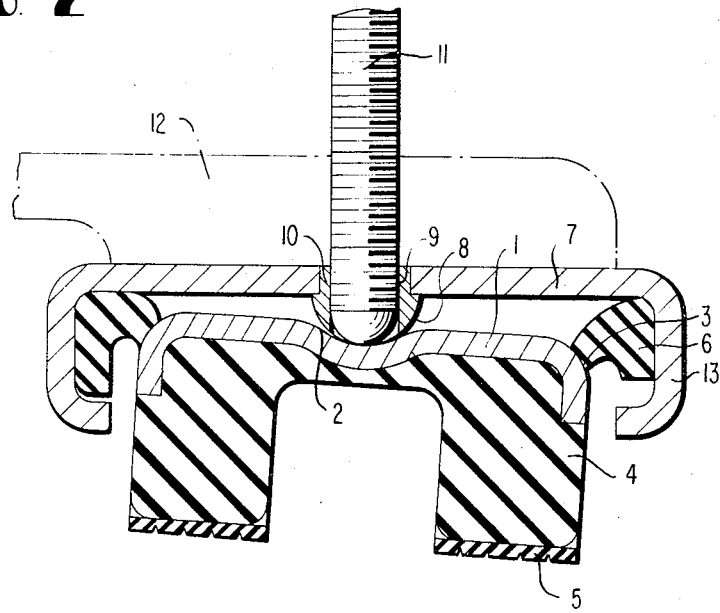
FIG. 2 is a vertical sectional view of the apparatus of this invention as applied to a machine which is installed on an inclined floor surface.

The apparatus of this invention can be used with any amount of level adjustment of the machine even when the installation floor is inclined. When the amount of level adjustment is zero, that is to say, when the boss 10 is in contact with the concave portion 2 of the metal plate 1, the convex portion 8 of the boss 10 with its arcuate surface having a smaller radius of curvature comes in contact with the concave portion 2 as shown in FIG. 2, and furthermore, the metal cap 7 is spaced apart from the metal plate 1. Thus, the stroke of level adjustment can be effectively made larger without involving waste. A further advantage of the apparatus of this invention is that the oil-resistant rubber plate 5 applied to the undersurface of the anti-vibratory rubber member 4 has good compatibility with the floor installation and permits stable standing of the machine as compared with the conventional metal plate lining.

What is claimed is:

1. An anti-vibratory apparatus comprising a cylindrical anti-vibratory rubber member lined with an oil-resistant rubber plate; a disc-like metal plate bonded to the upper surface of said rubber member, said metal plate including a shoulder portion bent downwards from its peripheral portion and a concave portion at its center having a curved surface with a large radius of curvature; a tongue-like rubber member having an inverted L-shape in section and extending at least annularly intermittent, said tongue-like rubber member being bonded at one end to the shoulder portion; a disc-like metal cap spaced from said metal plate and including a flange portion (of an L shape in section) and a convex portion projecting downwards from the undersurface of said metal cap, the central part of said cap having a raduis of curvature smaller than that of said concave portion of said metal plate, said flange portion holding tight the peripheral surface of said tongue-like member to leave a space between it and the end surface of said tongue-like member, said convex portion having secured thereto a boss and a leveling member having a rounded end surface with a far smaller radius of curvature co-axially received by said boss for axial adjustment therein.

2. The apparatus as claimed in claim 1, wherein said cap flange portion is L-shaped in section, and said levelling member comprises a bolt threadably received within said boss.

* * * * *